Nov. 3, 1942.     G. E. DANIELS     2,301,158
SCRAPER
Filed June 5, 1940     6 Sheets-Sheet 4

INVENTOR.
GORDON E. DANIELS
BY Fred N. Schwend
ATTORNEY.

Nov. 3, 1942.                G. E. DANIELS                2,301,158
                               SCRAPER
                          Filed June 5, 1940            6 Sheets-Sheet 5

INVENTOR.
GORDON E. DANIELS
BY Fred N. Schwend
ATTORNEY.

INVENTOR.
GORDON E. DANIELS
BY Fred N. Schwend
ATTORNEY.

Patented Nov. 3, 1942

2,301,158

UNITED STATES PATENT OFFICE 2,301,158

SCRAPER

Gordon E. Daniels, Los Angeles, Calif.

Application June 5, 1940, Serial No. 338,908

23 Claims. (Cl. 37—126)

The present invention relates to dirt scraping apparatus, and has particular reference to apparatus wherein a dirt accumulating body, having a scraping edge or blade associated therewith, is dragged over the surface of the ground to be scraped, the scraping edge biting or cutting into the surface of the ground, and the forward movement of the body effecting movement of the dirt or other materials scraped upwardly into the body. When the scraper body has received a capacity load, or less as desired, it is raised to remove the scraper edge from contact with the ground and it is then hauled to a point where it is desired to discharge the load.

In scrapers of this type, the dirt after passing over the scraping edge tends to collect or pile up directly behind and above this edge. Continued influx of the dirt causes it to thereby pack into a hardened mass making it difficult for further movement of the dirt into the scraper body and, furthermore, tending to prevent shifting of the dirt located directly behind the scraping edge rearwardly toward the back of the body. These difficulties have resulted in the construction of scrapers having relatively small dirt capacity, at least as far as the length of the dirt accumulating body as measured from the scraping edge to the rear of the body is concerned, or the incorporation of additional mechanism for forcing the dirt rearwardly to prevent packing of the same above the scraping edge and to shift it away from such edge.

Although such mechanisms for forcing the dirt away from the scraping edge have been successfully employed as exemplified in the machine disclosed and claimed in my copending patent application, Serial No. 243,562, filed December 2, 1938, for "Dirt scraping apparatus," of which the present application is a continuation in part, they are not particularly suited for machines of the type wherein a forward bowl or apron is employed to hold a considerable amount of scraped material.

One object of the present invention is to reduce packing of dirt directly above the scraping edge of a scraper.

A further object of the invention is to facilitate filling of a scraper of this class universally throughout.

Another object of the invention is to reduce the force necessary to fill a scraper of this class with scraped material.

A further object of the invention is to automatically shift dirt accumulated by the scraping edge of a scraper of this type toward the rear of the scraper body.

A further object of the invention is to effect control of a scraper bowl or apparatus by mechanism for hoisting a scraper apparatus.

A further object of the invention is to reduce the number of control elements necessary to control the operation of a scraper apparatus.

The manner in which the above and other objects of the invention are accomplished will be readily understood on reference to the following specification when read in conjunction with the accompanying drawings wherein.

The present invention contemplates a scraper arrangement whereby the material scraped is both distributed in the scraper body and at the same time is prevented from being packed into a solid mass above the scraper edge by manipulation of the scraper bowl or bowls. This arrangement is such that a minimum amount of force is required to operate the scraper bowl or bowls in an effort to move the scraped material and to distribute this material uniformly throughout the scraper body. Furthermore, the particular combination of elements embodying the present invention makes it possible to effect a maximum relative movement of the bowls for such movement of the scraped material.

The invention also provides a means whereby only two operating cables are needed to operate the hoisting mechanism, and means for dumping the scraped material when desired, while at the same time causing the hoisting mechanism to automatically control relative movement of the scraper bowls to prevent release of scraped material from the scraper body after the same has been hoisted to a position preparatory to moving the scraper from one place or another with the scraped material therein. Also, the hoisting cable is capable of effecting movement of the scraper apron or forward bowl to discharging position under control of movement of certain parts of the scraper mechanism to abnormal positions.

Figure 1:
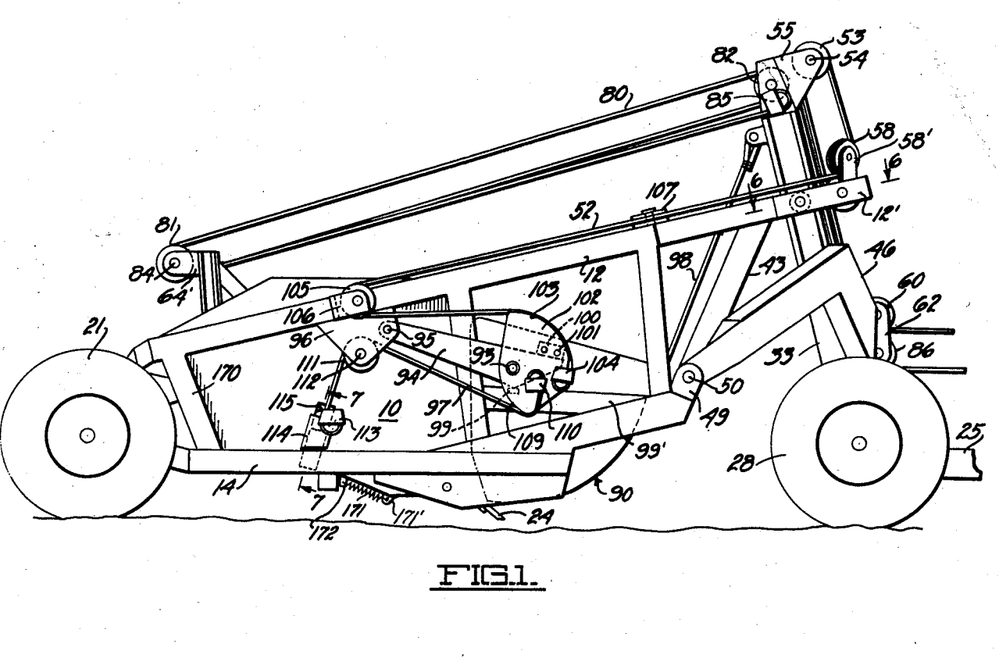
Fig. 1 is a side elevational view of a preferred form of scraper apparatus embodying the present invention, and is shown in a raised position.
Figure 2:
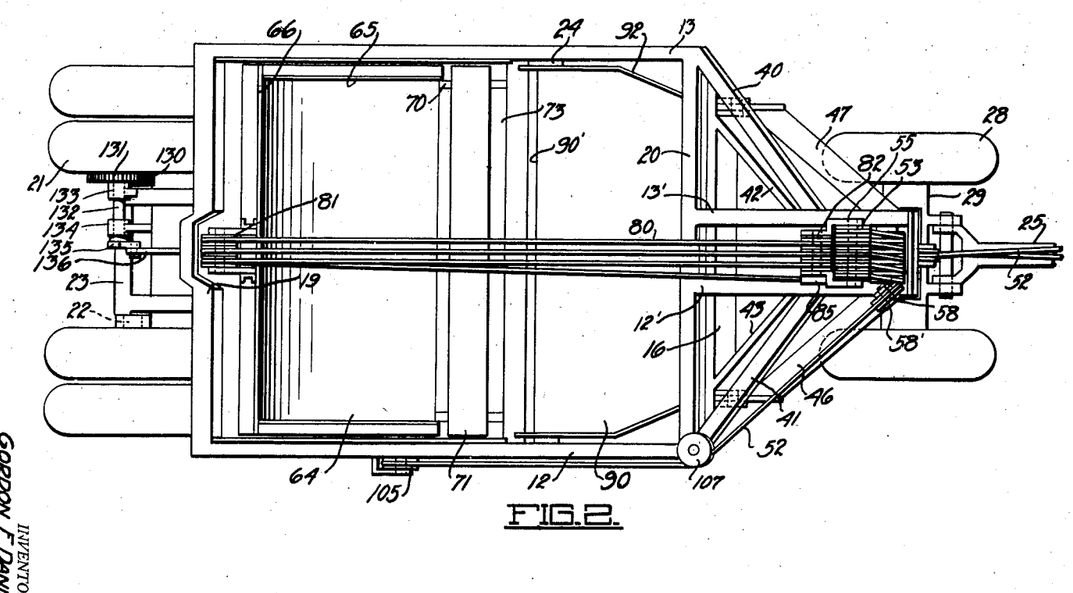
Fig. 2 is a plan view of the scraping apparatus.
Figures 3, 4:
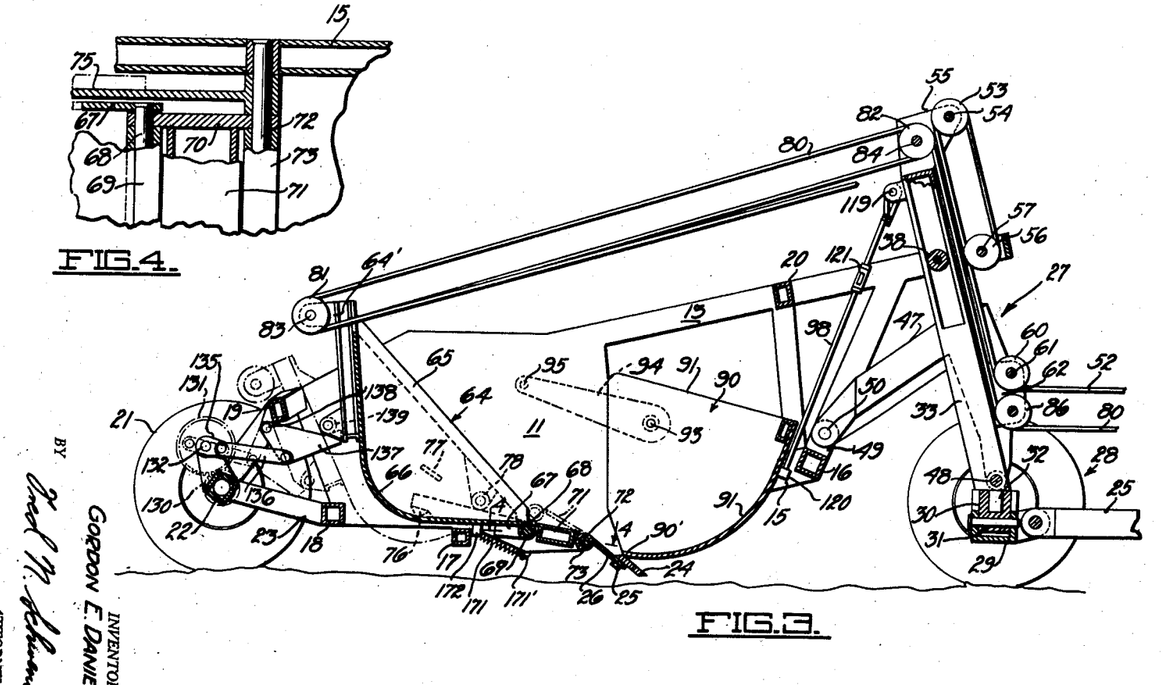
Fig. 3 is a longitudinal sectional view in elevation of the scraping apparatus.
Fig. 4 is a fragmentary sectional view taken substantially along the line 4—4 of Fig. 3 illustrating the pivotal supports for the auxiliary floor panel and the forward end of the main scraper bowl.

Referring in particular to Figs. 1, 2, and 3, the side walls 10 and 11 of the scraper body are secured at their upper ends to longitudinally extending beams 12 and 13, respectively, and at their lower ends to longitudinally extending beams 14 and 15, respectively. These side walls 10 and 11 are held in spaced relation by transversely extending beams 16, 17, 18, 19, and 20.

The rear of the scraper is supported by pneumatic tired wheels 21, having a common axle 22, which is supported by brackets 23 extending from the beams 18 and 19.

A scraping blade 24, comprising the scraping edge, is supported amidships and is removably secured by bolts 25 to a transversely extending plate 26 which, in turn, is suitably secured at either end thereof to the side walls 10 and 11 in an inclined position. The blade 24 extends below the remainder of the scraper body in a position to engage the surface of the ground being scraped when the body is lowered a slight distance below the position illustrated in Figs. 1 and 3.

The forward end of the scraper is supported for a limited vertical movement on a truck, generally indicated at 27, mounted on pneumatic tired wheels 28. The axle 29 for these forward wheels 28 has pivotally secured thereto a tongue 25 which is drawn by a suitable tractor, (not shown). A bearing block 30, (Fig. 3), is mounted within a well formed centrally in the axle 29 and is movable about a pin 31 passed through the axle.

The block 30 has a vertically extending socket formed therein to journal a depending bearing stud 32 extending downwardly from the lower end of a post 33.

Figures 5, 6, 7, 8:
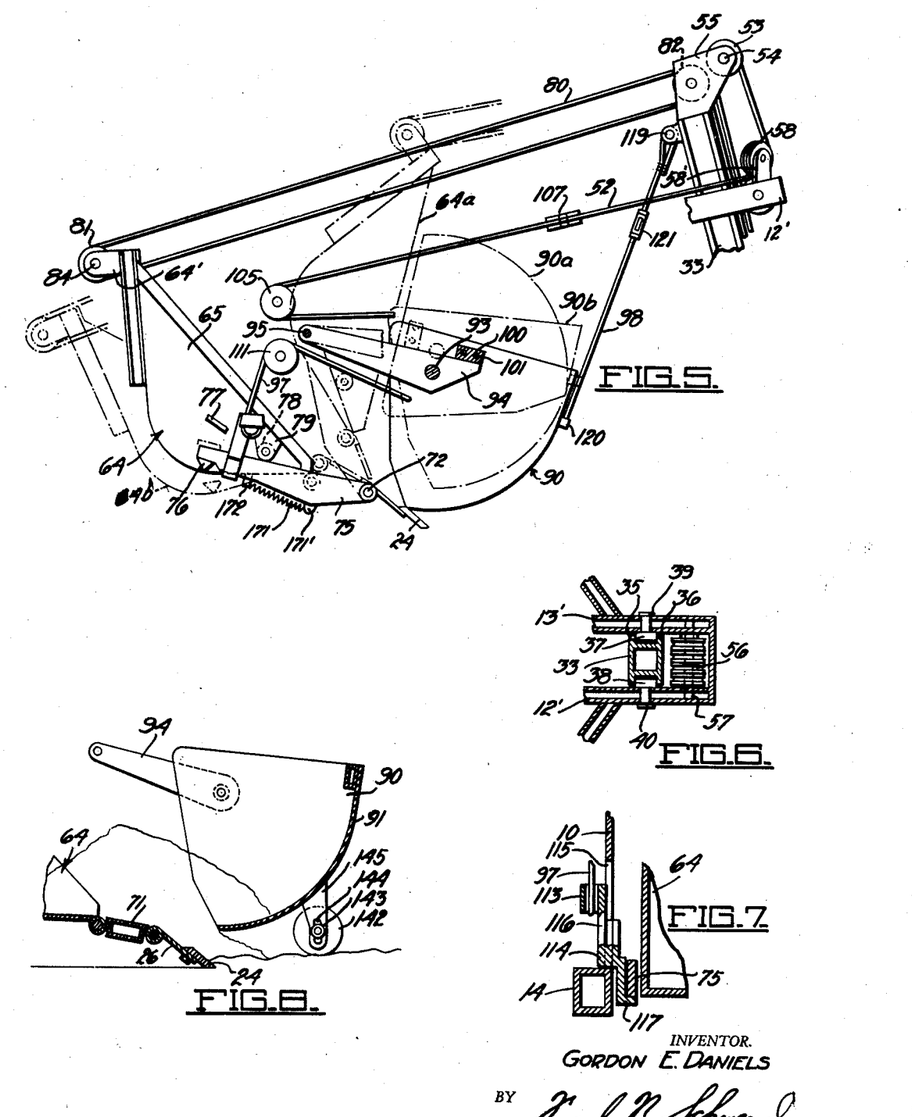
Fig. 5 is a side elevational view, with parts broken away, illustrating the different scraper mechanisms in different positions.
Fig. 6 is a sectional plan view through the post guiding means and is taken along the line of 6—6 of Fig. 1.
Fig. 7 is a transverse sectional view illustrating the apron closing block and is taken along the line 7—7 of Fig. 1.
Fig. 8 is a sectional view illustrating a modified form of means for opening and closing the apron or forward bowl.

As shown in Fig. 6, the post 33 is substantially square in cross section, and has a pair of spaced guide flanges 35 and 36 formed on either side thereof. These flanges, or rails, have slidably fitted therein, a pair of guide rollers 37 and 38 journaled on pins 39 and 40, respectively, secured in beams 12' and 13' forming part of the framework of the scraper body, which beams are secured at their rearmost ends to the cross beam 20 and intermediately thereof by tie beams 40 to 43, inclusive, the former two of which extend from the forward ends of the beams 12 and 13, respectively, while the latter extend from the transverse beam 16.

The rollers 37 and 38 form guide bearings whereby the entire scraper framework may be moved vertically along the post 33 so as to raise and lower the scraper blade 24 toward and away from the surface of the ground over which the scraper is drawn.

A pair of inverted U shaped link members, 46 and 47, are pivotally supported at their lower ends on opposite sides of the lower portion of the post 33 by a transversely extending pin 48, (Fig. 3), passed through the post, and are pivotally supported at their rearmost ends to brackets 49 extending from the beam 16 by coaxially arranged pins 50.

The forward end of the scraper body is raised and lowered along the post 33 by means of a hoist cable 52 operable through a block and tackle arrangement comprising a series of sheaves 53 mounted on a pin 54 secured to flanges 55 affixed to the top of the post 33, and a plurality of sheaves 56 journaled on a shaft 57, (Figs. 3 and 6), extending between the two beams 12' and 13'. The leftmost strand of the hoist cable 52, as viewed in Fig. 2, is wrapped around a sheave 58 (Fig. 1) which is supported above the beam 12' by a suitable bracket 58', and extends rearwardly, being connected to the forward bowl or apron in a manner to be described hereinafter.

The other end of the cable 52 extends along the forward edge of the post 33 and around a pulley 60 (Fig. 3) journaled on a stub shaft 61 extending between brackets 62 formed integrally with the post 33.

The forwardly extending end of the cable 52 is preferably operated by a power driven winch (not shown) provided on the tractor and under control of the tractor operator in a manner commonly employed for scrapers of this type.

Assuming the rearwardly extending portion of the cable 52 to be held against movement, operation of the tractor winch will shorten the length of the cable 52 and thereby draw the scraper body upwardly causing the rollers 37 and 38 (Fig. 6) to move along the guideways formed by the flanges 35 and 36 extending on opposite sides of the post 33.

The above mentioned novel hoist mechanism permits a substantial raising and lowering movement to be applied to the scraper body with a minimum rocking movement applied to the post 33. Therefore, the weight of the scraper apparatus is applied substantially longitudinally of the post 33, thereby reducing complicated stresses from being incurred in the post and enabling the same to be made as light as possible while forming a simple arrangement of levers to effect the hoisting operation. Furthermore, this hoist mechanism forms a compact arrangement to effect a reduction of weight of the scraper.

As shown in Figs. 2 and 3, the scraper body has incorporated therein a main bowl 64 which is movable between the side walls 10 and 11, comprises end walls 65 and a combined floor and rear wall member 66. The forward end of the member 66 has secured thereunder a pair of brackets 67 (Figs. 3 and 4) between which extends a shaft 68. A sleeve 69 is pivotally mounted on the shaft 68 and is secured as by welding, to the forward edge of the member 66. Interposed between the brackets 67 and the sleeve 69, and pivotally mounted on the shaft 68 are links 70 situated adjacent either end of the bowl 64, which links support a floor panel 71 extending the length of the main bowl 64. The floor panel 71 has the rearmost edge thereof juxtaposed the sleeve 69. The foremost ends of the links 70 are pivotally mounted on a shaft 72 which extends between and is secured to the lower longitudinally extending beams 14 and 15. A sleeve 73, similar to that of 69, is mounted on the shaft 72 between the links 70, and is welded to the juxtaposed plate 26 mentioned hereinbefore. The foremost edge of the panel 71 extends closely adjacent the surface of the sleeve 73 so as to form a flexible floor joint.

Journaled on the shaft 72 at either end thereof (Figs. 3, 4, and 5) are two bowl supporting links 75, each of which extends rearwardly between the corresponding end walls 65 of the bowl 64 and the adjacent one of the side walls 10 and 11. As shown in Figs. 3 and 5, the rearmost portion of each of the links 75 extends in the path of a pair of spaced projections or lugs 76 and 77 secured on a corresponding end wall 65 of the bowl 64.

The main bowl 64 is supported in part, at all times, by coaxially extending rollers 78 rotatably mounted on brackets 79 on opposite sides of the bowl 64, which rollers rest on the upper edge of the bowl supporting links 75. Thus, the main bowl 64 may be rocked a limited amount, from its position illustrated in full lines to its lowermost position illustrated in dot and dash lines in Fig. 5 without affecting the positions of the links 75. During such rocking, the bowl pivots about the point of contact of the rollers 78 on the links 75 while the bowl is rocked from a position wherein the upper lugs 77 contact the upper surfaces of the links 75 to a position wherein the lower lugs 76 contact the undersurfaces of said links. During this rocking movement, the shaft 68 is raised and lowered a limited amount so as to vary the inclination of the panel 71, causing a pivotal movement thereof about the shaft 72 while providing a continuous floor surface for supporting the dirt regardless of the position of the bowl 64 at any time.

To effect a rocking movement of the bowl 64, means operable by a tractor winch as well as means automatically operable upon forward movement of the scraper apparatus is provided. An operating cable 80 is wrapped around a pair of sets of sheaves 81 and 82 mounted on shafts 83 and 84, respectively, the former shaft being supported on brackets 84' extending rearwardly from the upper end of the wall member 66 of the bowl 64. The shaft 84 is supported in the flanges 55 affixed to the top of the post 33 (Figs. 2 and 3).

As shown in Fig. 1, one end of the operating cable 80 is secured at 85 to the top of post 33 while the other end thereof, after extending around the rightmost one (Fig. 2) of the set of sheaves 82 is wrapped around a pulley 86 journaled on a shaft 87 extending between the hereinbefore mentioned brackets 62 and thence passes to a tractor winch (not shown).

The cable 80 may be employed to rock the main bowl 64 upwardly from its illustrated full line position of Fig. 5, which operation is intended to take place during dumping or discharging of the load. As the bowl 64 is raised by the cable 80 above its upper limit of normal rocking movement during loading (illustrated in full lines in Fig. 5), the lugs 76 thereon engage the under surfaces of the bowl links 75 and, thereafter, the bowl and links move as a rigid unit about the forward pivotal shaft 72.

A spring 171 is tensioned between a lug 171' on each of the links 75 and a lug 172 on the corresponding end of the bowl 64, on the under surface thereof, to urge the bowl 64 toward its lowermost position relative to the links 75. The provision of these springs 171 enables the bowl 64 to be moved further clockwise when rocked to dumping position as indicated by the dot and dash lines 64a of Fig. 5 while permitting the same to rock back to its lowered positions by gravity upon release of the cable 80.

A forward bowl or apron 90 is supported from the scraper body in front of the scraper blade 24 to receive and carry dirt or other scraped material in front of the blade. This apron has an arcuate shaped floor section 91 joined by side walls 92. Coaxially extending pivotal pins 93 on either side wall 92 of the apron are pivoted in bearings formed in links 94, the rearmost ends of which are pivotally supported by pins 95 extending between the adjacent end walls 10 and 11, and respective flanges 96 depending from the beams 12 and 13. This arrangement enables the apron 90 to be pivoted about either of a pair of spaced axes in a manner described hereinafter.

The operation of the apron 90 is controlled by three cables, the hoist cable 52, an apron control cable 97, and a lifting cable 98, the former two cables being operable to cause the apron to rock from its full line position of Fig. 5 to its dot and dash line position 90a during dumping while the latter cable 98 is operable to move the apron from its normal digging position into closing relation with the scraping blade 24 as illustrated by the full lines of Fig. 5, whenever the scraper body is raised from contact with the surface of the ground on which it rests.

As shown in Fig. 1, the forward ends of the two links 94 rest on lugs 99 extending from beams 99' whenever the scraper is in its carrying position. A block 100 (Fig. 5) is secured as by bolts 101 to the side of the apron 90 illustrated in Fig. 1 and is adapted to contact the upper surface of the link 94 to prevent rocking of the apron clockwise beyond the full line position of Fig. 5 relative to the link 94 or counterclockwise beyond the dot and dash line position 90a during the dumping operation. Supported from the previously mentioned end walls of the apron by means of the bolts 101 and pin 93 is a pulley block 102 (Fig. 1) which projects over the side of the beam 99' and has an arcuate upper surface 103 formed thereon concentric with the pivot pin 93, with a peripherally extending groove therearound to receive the rearmost end of the hoist cable 52. This cable is secured by a well-known type of wedge anchor 104 to the side of the pulley block 102, and extends along the groove of the arcuate surface 103 of the block 102, around a pulley 105 rotatably mounted in a suitable bracket 106 secured to the beam 12 in juxtaposition with the pivot pin 95, being located slightly to the rear thereof. The cable 52 thereafter extends around a second pulley 107 rotatably mounted on top of the beam 12 adjacent the forward end thereof, from which pulley the cables passes around the previously mentioned pulley 53.

The block 102 has a second arcuate portion 109 formed thereon eccentric with the coaxial pivot pins 93 connecting the apron 90 to the apron links 94, and also has a peripheral groove formed thereon to guide the apron control cable 97 therearound. One end of the cable 97 is secured by an anchor 110 to the face of the block 102, while the other end thereof passes around a pulley 111 rotatably mounted on a shaft 112 extending between the flange 96 and the side wall 10, and is secured by means of an anchor 113 to the upper end of an apron closing block 114 (Figs. 1 and 7). This block is movable along a slot 115 formed in the side wall 10 to enable a limited travel thereof and is provided with guide flanges 116 to prevent the same from being removed from the slot 115. The block 114 has a lip 117 which underlies the link 75 illustrated in Figs. 1, 5, and 7, and is thus controlled thereby.

The above arrangement of the cables 52 and 97 enables the main bowl 64 to control operation of the apron 90 during discharge of a load. Whenever the bowl 64 is in either of its two lowermost illustrated positions of Fig. 5 or in any position therebetween, the weight thereof is sufficient to cause the links 75 to pull the operating cable 97 against the action of the hoist cable 52, due to the power ratio involved in the block and tackle arrangement comprising the sheaves 53 and 56, thereby maintaining the apron 90 in its extreme clockwise position with the block 100 in engagement with the upper surface of the corresponding link 94, which position is shown in Fig. 5. However, as soon as the operating cable 80 is drawn to raise the bowl 64 above the illustrated full line position thereof in Figs. 3 and 5, the links 75 are raised releasing tension on the cable 97 and thus enabling the hoist cable 52 to rock the apron 90 in a counterclockwise direction about its pivot pins 93 until it assumes the position indicated at 90a wherein the block 100 again engages the upper surface of the corresponding link 94.

Since the pulleys 105 and 111 are located closely adjacent the pivot pins 95 of the apron links 94, the apron 90 may be moved up and down by causing the links 94 to pivot about the pins 95 without substantially changing the angular relationship between the apron and the links 94, and irrespective of any movement of the hoist cable 52 and the apron closing cable 97.

The operating cable 98 is secured at the upper end thereof to a lug 119 extending from the post 33 and at the lower end thereof to a lug 120 extending from the floor member 91 of the apron 90. Thus, as the hoist cable 52 is operated to raise the scraper body to disengage the scraper blade 24 thereof from the surface of the ground, the distance between the lug 119 and the scraper framework is reduced enabling the apron and the links 94 connected thereto to pivot as a unit about the pins 93, due to the weight of the apron and any dirt thereon, until the lowermost edge 90' thereof engages the scraper blade 24 and thereby prevents discharge of dirt over the scraper blade. In the event that dirt or other scraped material prevents the apron 90 from completely closing, the cable 80 may be manipulated to rock the bowl from the full line position of Fig. 5, upwardly, to a position wherein the hoist cable 52 may rock the apron 90 slightly about the pivot pins 93 and away from the blade 24. Thereafter, the bowl 64 may be allowed to rock back to either of its positions illustrated in Fig. 5 causing the apron controlling cable 97 to rock the apron 90 about the pins 93 with a force sufficient to enable the same to close regardless of the scraped material extending between the rearmost edge 90' of the apron and the blade 24. Likewise, as the hoist cable 52 is operated to lower the scraper into digging position, the cable 98 becomes operative to rock the apron and the links 94 to the positions indicated by the dot and dash lines 90b of Fig. 5 thereby forming a small opening into which dirt, scraped by the blade 24, may be introduced into the body while enabling the apron to catch and support a substantial amount of dirt in front of the blade.

The above provision for raising and lowering the apron 90 independently of the operation of the cables 52 and 97 also permits the apron to be raised by means of large objects, such as rocks or the like, which may be in the path of the blade 24 as it is dragged over the surface of the ground. In the event such objects are encountered, the inclined undersurface of the apron will strike the same and cam the apron upwardly enabling those objects to be moved into the rear bowl 64. The apron will then be allowed to drop down to a position limited by the cable 98. In order to regulate the opening between the lower edge 90' of the apron 90 and the scraper blade 24, as may be required for different kinds of material being scraped or different depths to which the scraper blade 24 is lowered, an adjusting turnbuckle 121 is provided to lengthen or shorten this cable as desired.

A preferred method of opeating the cables 52 and 80, and the resulting movements of the bowl 64 and apron 90 during loading operations is diagrammatically illustrated in Figs. 9 to 14, inclusive. Although the operation of filling the scraper to its capacity is shown as being completed in two successive rocking movements of the bowl from its lower loading position to its upper loading position, in actual practice this may consist of a much greater number of rocking cycles depending upon the capacity of the scraper, as well as the type of material being scraped. In all of these figures, the scraper is shown as being maintained in a loading position wherein the scraper blade 24 is embedded in the surface of the ground so as to direct a layer or strata of the ground upwardly into the scraper body.

Figure 9:
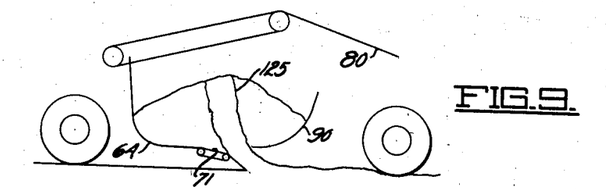
Figs. 9 to 14, inclusive, illustrate in sequence the different movements of the scraping apparatus while accumulating a full capacity load of scraped material.
Figure 10:
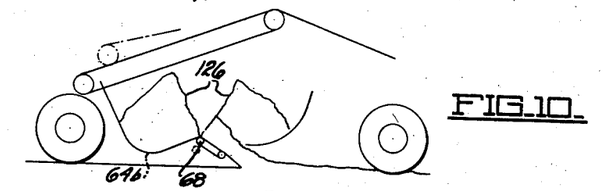
Figure 11:
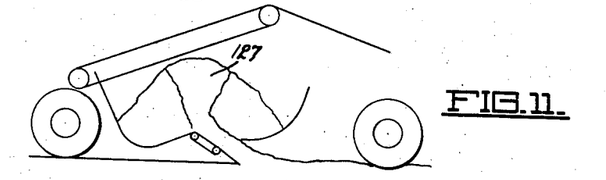
Figure 12:
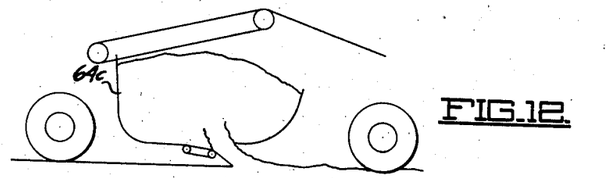
Figure 13:
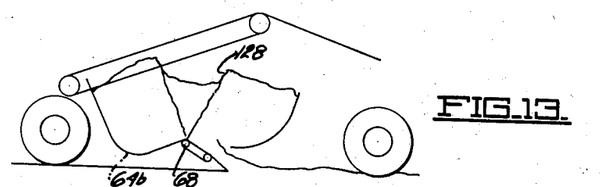
Figure 14:
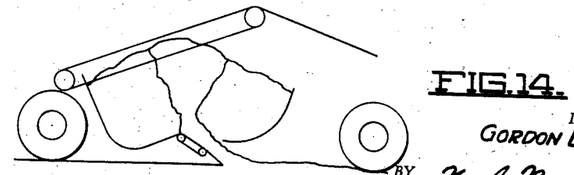

As the dirt is introduced upwardly into the scraper body comprising the bowl 64 and apron 90, some of it falls forwardly or rearwardly of the opening in front of the scraper blade, while the remainder, braced by such forward and rearward piles of dirt extends substantially vertically and, due to further influx of the same material, tends to pack and form a solid mass or vertically extending strata above and slightly to the rear of the opening. This condition is illustrated in Fig. 9, such strata being indicated at 125. Thereafter, the operating cable 80 is allowed to slacken to cause the dirt to move the bowl 64 to its lowermost position 64b (Fig. 10), at which time a fracture 126 may be formed in the strata 125, such fracture extending from a point substantially directly above the pivot shaft 68. Due to this rocking movement of the bowl 64, the dense strata 125 is broken up and material to the rear of the fracture 126, being rocked rearwardly tends to shift toward the end wall of the bowl. The bowl is then allowed to remain in its position illustrated in Fig. 10 for a continued forward movement of the scraper, enabling further influx of dirt to proceed into the position formerly occupied by the dense strata 125, that is, in the opening formed by the fracture 126 if such has occurred. As such increase causes a pile up of material in such a manner as to again cause a dense strata directly above the scraping blade, as illustrated Fig. 11 at 127, the cable 80 is again operated to draw the bowl 64 into its upper loading position 64c (Fig. 12). The rocking movement of the bowl 64 toward the apron 90 imparts a squeezing action to the dirt in the scraper body and thereby forces it into intimate contact with the end walls of the bowl and apron, thus distributing it more or less evenly throughout the scraper body as exemplified in Fig. 12. The bowl 64 is then again allowed to retract to its lowermost position 64b (Fig. 13), causing a second fracture 128 to appear directly over the pivot shaft 68 and diverging upwardly. This fracture causes a void and also breaks any stratified formation of the dirt directly above the opening of the blade 24 to facilitate further influx of the dirt into the body. If such fracture does not occur, at least a breaking up of the dense formation of dirt above the blade 24 is effected. These recurring cycles of operation are continued until a full capacity load, as illustrated in Fig. 14, is obtained, at which time the hoist cable 52 (Figs. 1, 2, and 3) is operated to raise the scraper body from engagement with the ground and to automatically cause the apron 90 to close to prevent discharge of the dirt until the cable 80 is subsequently pulled.

Referring to Figs. 2 and 3, means are provided to automatically raise and lower the main bowl 64 between its upper and lower limits of movement during loading operation, and for this purpose a pinion 130 is secured to one of the rear wheels 21 and is in mesh with the gear 131 secured on a shaft 132 which is journaled in bearings 133 and 134, suitably supported from the brackets 23 of the scraper framework. A crank 135 is secured on the shaft 132 and is connected by means of a link 136 to a cam element 137. This cam element is pivoted at 138 on a bracket extending from the upper cross beam 19 and is positioned to cam a roller 139 rotatably mounted on a suitable bracket supported from the rear of the bowl 64.

On forward movement of the scraper body by means of the tractor hereinbefore described, rotation of the pinion 130 by the wheel 21 will cause rotation of the crank 135 to impart a reciprocating motion to be applied to the link 136 to oscillate the cam 137 and effect a rocking movement of the bowl 64 between its extreme limits of traverse during loading. If and when it is desired to prevent such automatic operation, the operating cable 80 may be drawn to maintain the bowl in its full line position illustrated in Fig. 3, or slightly clockwise therefrom. Furthermore, if desired, the link 136 may be disconnected relying on the tractor operator to effect rocking of bowl 64 under manual control.

Figure 15:
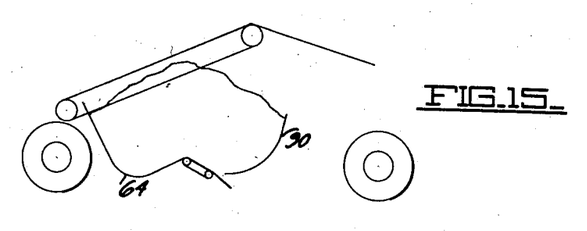
Fig. 15 illustrates the scraping apparatus diagrammatically while supporting a capacity load in carrying position.
Figure 16:
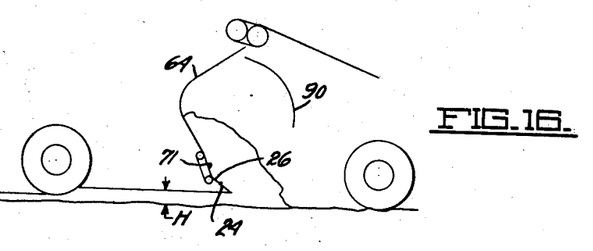
Fig. 16 illustrates the scraping apparatus diagrammatically during a dumping operation.

Fig. 15 illustrates the scraper diagrammatically in a carrying position with a capacity load of material preparatory to a dumping operation while Fig. 16 illustrates diagrammatically the scraper with the bowl 64 and apron 90 moved to their extreme end positions during a dumping operation. During this operation, it will be noted that an extremely large opening is provided between the scraper blade 24 and the lowermost edge of the apron 90 to provide unhampered movement of the material over the blade 24. Furthermore, it will be noted that the floor section of the bowl 64, the floor panel 71, plate 26 and blade 24 form a substantially unbroken sliding surface to facilitate downward movement of the material by gravity over the blade 24. By regulating the height of the scraper body relative to the ground over which it is drawn, by means of the hoist cable 52, the depth of the layer of dirt formed during the dumping operation, may be governed as desired.

The dumping operation is as follows: While the scraper is in a raised or carrying position as shown in Fig. 15 with the bowl 64 in either of the two alternate positions illustrated in Fig. 3, preferably that shown by the dot and dash lines, the operating cable 80 is drawn to move the bowl toward its dumping position shown in Fig. 16. The distance of the blade 24 above the surface of the ground during this operation does not affect operation of the dumping mechanism. However, since the body will drop slightly upon rocking of the apron 90 toward the position shown in Fig. 16, the body and, consequently the blade 24, may be initially positioned at a slightly higher elevation than the desired depth of the layer of dirt ejected from the body and indicated at H in Fig. 16.

As the cable 80 is retracted, the restraining action of the bowl 64 upon the apron closing cable 97 is released enabling the rearwardly extending end of the hoist cable 52 to cause a rocking movement to be transmitted to the apron. The apron 90 continues in its rocking movement until the stop 100 (Fig. 5) engages the upper surface of the link 94 whereupon downward movement of the scraper body is prevented except by releasing the cable 52.

Fig. 8 illustrates a modified mechanism for automatically opening and closing the apron 90 with respect to the blade 24. This means comprises a wheel or roller 142 which is rotatably mounted on a pin 143. This pin 143 is adapted to be secured in different positions along elongated slots 144 extending vertically in juxtaposed brackets 145. The brackets 145 are suitably secured to the under surface of the floor member 91 of the apron 90. The roller 142 rides over the surface of the ground being scraped in advance of the blade 24 and governs the height of the lowermost edge of the apron 90 relative to the cutting edge of the blade 24. Thus as the scraper frame is lowered to cause the cutting edge of the blade 24 to dig deeper into the ground, the apron 90 is raised a proportionate amount to increase the opening between the same and the blade 24 thereby allowing a greater influx of dirt. Also, as the roller 142 engages any large object such as a rock, it tends to roll over the same and therefore increase the opening so as to permit such object to be easily directed into the scraper body.

Figure 17:
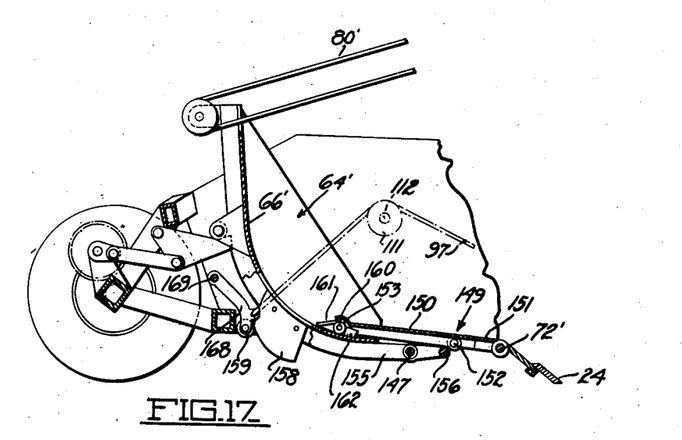
Fig. 17 is a longitudinal sectional view illustrating a modified form of main scraper bowl and auxiliary floor panel therefor.

Fig. 17 illustrates a modified form of main bowl and floor sections associated therewith. In this case, the bowl 64' is preferably pivoted, by means of a shaft 147 directly to the framework of the scraper. The floor member 66' of the bowl is substantially arcuate in cross section and is overlapped by an articulated floor member 149. This member comprises two separate sections 150 and 151 pivoted together at 152. The latter section 151 is in turn pivoted on a shaft 72' extending between the lower longitudinal beams of the scraper framework.

It will be noted that the adjacent ends of the two sections 150 and 151 are so arranged as to prevent relative movement of the section 150 in a clockwise direction relative to section 151 beyond that position illustrated in Fig. 17 while enabling the two sections to collapse about the pivot 152 when the section 150 is rocked counterclockwise of section 151.

A pair of spaced rollers 153 are rotatably mounted on a shaft 160 extending between opposite braces 160 and situated at the rearmost end of the section 150. A transversely extending sealing member 161 is provided having rearwardly extending guides 162 at opposite ends thereof.

These guides ride on the upper surface of the wall member 66' of bowl 64' so as to maintain the rear edge of the member 161 substantially in sliding contact with the wall member 66' throughout the length of travel of floor section 150. This arrangement, while preventing any dirt from falling between the wall member 66' and the floor section 150 also acts to remove or scrape any dirt clinging to the wall member.

Either end brace 155 of the bowl 64' extends forwardly beyond the pivot shaft 147, and these two braces have a bar 156 extending there-between so as to engage the under surface of the floor section 150, adjacent the pivot 152, when the bowl 64' is rocked in a counter-clockwise direction beyond the position illustrated in Fig. 17.

A cam plate 158 is suitably secured on one of the braces 155 of the bowl 64' and is engaged by a roller 159 mounted on the lower end of an arm 168. This arm is pivoted at 169 to the scraper framework, such as the brace 170 (Fig. 1), and has connected thereto, the rearmost end of the apron control cable 97. The forward end of this cable is employed to restrain the apron 90 against rocking movement by the hoist cable 52 in the same manner as disclosed in connection with Figs. 1 and 5.

During loading operations, the cable 80', similar to that of 80, is moved to rock the bowl 64' a limited amount about the shaft 147 so as to move dirt or other material directed therein by the blade 24, in the same manner as was described hereinbefore in connection with the bowl 64 of Figs. 1 to 16. During this movement the bar 156, situated between the forward ends of the bowl supporting braces 155, causes the articulated floor section 149 to break about its pivot 152, and therefore allow the rearmost end of the floor section 150 to follow the contour of the floor member 148.

When it is desired to eject the scraped material from the bowl 64', the cable 80' is drawn to rock bowl 64' upon its upper limit of transverse during loading, which limit is illustrated in Fig. 17. As the bowl passes this upper limit, the camming surface of plate 158 allows the apron control cable 97 to be retracted under tension of the hoist cable 52, thereby enabling this latter cable to rock the apron 90 (Figs. 1 and 3) to its upper dumping position. During such rocking movement of the bowl 64' to its extreme clockwise position to effect ejecting of the material therefrom by gravity, the roller 153 on the floor section 150 rides along the inner surface of the floor member 66' and, since the articulated member 149 is prevented from breaking during this operation, the same will pivot about the shaft 72' as a rigid unit.

It is to be understood that, while I have herein described and illustrated a preferred form of my invention, it is not limited to the precise construction as disclosed herein, but includes within its scope whatever changes fairly come within the spirit of the appended claims.

What I claim as new and desire to secure by Letters Patent is:

1. Scraping apparatus comprising the combination of a frame adapted to be moved along the ground, a scraper blade supported by said frame, a bowl positioned rearwardly of said blade, means on said frame rockably supporting said bowl to guide the forward portion thereof toward and away from the ground, and means for conveying material scraped by said blade to said bowl in different rocked positions of said bowl.

2. Scraping apparatus according to claim 1 comprising means for moving said bowl from one of said positions to the other.

3. Scraping apparatus comprising the combination of a frame adapted to be moved along the ground, a scraper blade supported by said frame, a bowl adapted to receive material scraped by said blade, means on said frame supporting said bowl rearwardly of said blade for rocking movement about an axis positioned rearwardly of the forward edge of said bowl, means for conveying material scraped by said blade to said bowl in different rocked positions of said bowl.

4. Scraping apparatus comprising the combination of a frame adapted to be moved along the ground, a scraper blade supported by said frame, a bowl, a floor member pivotally supported adjacent one edge thereof by said frame in juxtaposition with said blade, means pivotally connecting said member adjacent an opposite edge thereof to said bowl in juxtaposition with the forward edge of said bowl, and means on said frame for supporting said bowl for movement about a pivot to the rear of said forward edge thereof.

5. Scraping apparatus comprising the combination of a frame adapted to be moved along the ground, means forming a scraping edge on said frame at the bottom thereof, a bowl, means on said frame for supporting said bowl for rocking movement about one pivot during said rocking movement thereof between certain limits, means on said frame for supporting said bowl for rocking movement about a second pivot spaced from said first mentioned pivot during said rocking movement of said bowl beyond one of said limits, and means for conveying material scraped by said edge to said bowl in different rocked positions of said bowl.

6. Scraping apparatus comprising the combination of a frame adapted to be moved along the ground, a scraper member on said frame at the bottom thereof, a bowl, a floor member, means on said frame pivotally supporting said floor member adjacent one edge thereof in juxtaposition with said scraper member, means pivotally connecting said member adjacent an opposite edge thereof to said bowl in juxtaposition with the forward edge of said bowl, means for pivotally supporting said bowl for movement about a pivot to the rear of said forward edge thereof during rocking movement of said bowl between certain limits, and means for causing said bowl to rock about said first mentioned pivotal means during rocking of said bowl beyond one of said limits.

7. Scraping apparatus comprising the combination of a frame adapted to be moved along the ground, means forming a scraping edge associated with said frame, a pair of bowls having material receiving edges on opposite sides of said edge, each of said bowls being adapted to receive material scraped by said edge, means on said frame rockably supporting one of said bowls to guide the material receiving edge thereof toward and away from the ground, and means for rocking said one of said bowls about said supporting means to move material therein toward and away from the other and means for conveying material scraped by said edge to said one of said bowls in different rocked positions thereof.

8. Scraping apparatus comprising the combination of a frame adapted to be moved along the ground, means forming a scraping edge associated with said frame, a pair of receptacles on opposite sides of said edge, each of said receptacles being adapted to receive material scraped by said edge, means for raising and lowering said frame toward and away from the ground, means responsive to said raising and lowering of said frame for rocking one of said receptacles about an axis toward and away from said edge, respectively, means for moving the other of said receptacles toward and away from said one of said receptacles, and means responsive to operation of said last mentioned means for rocking said one of said receptacles about a second axis spaced from said first mentioned axis.

9. In a scraping apparatus, the combination of a frame adapted to be moved along the ground, means forming a scraping edge associated with said frame, a pair of bowls on opposite sides of said edge and cooperating to receive material scraped by said edge, means for rocking one of said bowls, means for rocking the other of said bowls, and means comprising a member adapted to be weighted by said first mentioned bowl during a predetermined rocking movement thereof for rendering said last mentioned rocking means ineffective to rock said other of said bowls, said member being adapted to be unweighted by said first mentioned bowl during movement thereof beyond said predetermined movement for rendering said last mentioned rocking means effective.

10. In a scraping apparatus, the combination of a frame adapted to be moved along the ground, means forming a scraping edge associated with said frame, a bowl, means on said frame supporting said bowl for rocking movement on one side of said edge, a closure member on the other side of said edge, means for raising and lowering said frame toward and away from the ground, said last mentioned means tending to move said closure member away from said edge, means for rocking said bowl from a position wherein said bowl is adapted to receive material scraped by said edge to a position wherein said bowl is adapted to direct said material therefrom, and means comprising said bowl for disabling said raising and lowering means from moving said closure member away from said edge when said bowl is out of said last mentioned position and for enabling said raising and lowering means to move said closure member away from said edge on movement of said bowl away from said first mentioned position thereof and toward said last mentioned position thereof.

11. In a scraping apparatus, the combination of a frame adapted to be moved along the ground, means forming a scraping edge associated with said frame, means for raising and lowering said frame toward and away from the ground, a bowl adapted to receive material scraped by said edge, means on said frame supporting said bowl for movement about either of two pivotal axes spaced from each other, a second bowl adapted to receive material scraped by said edge, means on said frame supporting said second bowl for rocking movement, means operable by said raising and lowering means for controlling movement of said first mentioned bowl about one of said pivotal axes, and means operable by rocking movement of said second bowl for controlling movement of said first mentioned bowl about the other of said pivotal axes.

12. In a scraping apparatus, the combination comprising a frame adapted to be moved along the ground, means forming a scraping edge associated with said frame, a bowl adapted to receive material scraped by said edge, means on said frame supporting said bowl for rocking movement, common means for rocking said bowl and for raising and lowering said frame comprising differential means whereby said common means is adapted to raise and lower said frame independently of said bowl means for restraining said bowl from movement upon operation of said common means, and means for enabling and disabling said restraining means.

13. In a scraping apparatus, the combination of a frame adapted to be moved along the ground, means forming a scraping edge associated with said frame, a bowl adapted to receive material scraped by said edge, means on said frame supporting said bowl for rocking movement, means for continuously rocking said bowl back and forth between certain limits and means other than said first mentioned rocking means for rocking said bowl beyond one of said limits to render said first mentioned rocking means ineffective.

14. Scraping apparatus comprising the combination of a frame adapted to be moved along the ground, means forming a scraping edge associated with said frame, a pair of bowls on opposite sides of said edge, each of said bowls being adapted to receive material scraped by said edge, and means operable by one of said wheels upon rotation thereof for continuously moving one of said bowls toward and away from the other to effect distribution of material scraped by said edge in said bowls.

15. In a scraping apparatus, the combination of a frame adapted to be moved along the ground, means forming a scraping edge associated with said frame, a pair of bowls on opposite sides of said edge, each of said bowls being adapted to receive material scraped by said edge, common means for rocking one of said bowls toward and away from said edge and for raising and lowering said frame, means for moving the other of said bowls relative to said first mentioned bowl, and means comprising said last mentioned bowl for controlling movement of said first mentioned bowl by said common means.

16. Scraping apparatus comprising the combination of a frame adapted to be moved along the ground, means forming a scraping edge associated with said frame, a bowl adapted to receive material scraped by said edge, means on said frame supporting said bowl for rocking movement, an articulated floor member, means for pivotally supporting said floor member at one end thereof in juxtaposition with said scraping edge, the other end of said floor member overlapping the surface of said bowl, means operable by said bowl for breaking said member during rocking movement of said bowl between certain limits, and means for retaining said member rigid during movement of said bowl beyond one of said limits.

17. Scraping apparatus comprising the combination of a frame adapted to be moved along the ground, means forming a scraping edge associated with said frame, a bowl adapted to receive material scraped by said edge, an articulated floor member, means for pivotally supporting said floor member at one end thereof in juxtaposition with said scraping edge, the other end of said floor member overlapping the surface of said bowl, means on said frame pivotally supporting said bowl for rocking movement about an axis to move material therein toward and away from said edge, said axis being located beyond the point of articulation of said floor member and on the side of said point of articulation opposite said first mentioned pivotal supporting means, means for breaking said floor member about said point of articulation during movement of said bowl to move material away from said edge, and means for retaining said floor member rigid during movement of said bowl to cause said material to move toward said edge.

18. Scraping apparatus comprising the combination of a frame adapted to be moved along the ground, a scraper blade supported by said frame, a bowl adapted to receive material scraped by said blade, means forming a support, means on said frame for supporting said supporting means for movement about one pivot, means on said supporting means for supporting said bowl for movement above a second pivot spaced from said first mentioned pivot, means for rocking said bowl about said second pivot in a certain direction, and means operable upon rocking movement of said bowl to a predetermined position with respect to said supporting means for preventing further relative rocking movement between said bowl and said supporting means and for causing said supporting means to rock about said first mentioned pivot upon further rocking movement of said bowl in said certain direction.

19. Scraping apparatus comprising the combination of a frame adapted to be moved along the ground, means forming a scraping edge associated with said frame, a pair of receptacles on opposite sides of said edge, each of said receptacles being adapted to receive material scraped by said edge, means for raising and lowering said frame toward and away from the ground, a link, a pivotal connection between said link and said frame, a second pivotal connection between said link and one of said receptacles, holding means controlled by the other of said receptacles for substantially preventing rocking movement of said one of said receptacles about said second pivotal connection, means responsive to raising and lowering of said frame for rocking said one of said receptacles and said link about said first mentioned pivotal connection, and means for moving the other of said receptacles toward and away from said one of said receptacles, whereby to disable said holding means.

20. In a scraping apparatus the combination comprising a frame adapted to be moved along the ground, means forming a scraping edge associated with said frame, a pair of bowls on opposite sides of said edge and cooperating to receive material scraped by said edge, means for rocking one of said bowls, a second means operable independently of said first mentioned rocking means for rocking the other of said bowls, and means comprising said first mentioned bowl for disabling said second rocking means on movement of said first mentioned bowl through a predetermined path, said last mentioned means being responsive to movement of said first mentioned bowl beyond said path of movement for enabling said second rocking means.

21. Scraping apparatus comprising the combination of a frame adapted to be moved along the ground, a bowl and a closure member carried by said frame, means comprising a connecting member pivotally connected at one point thereof to said frame and at another point thereof to said closure member, means for raising and lowering said frame toward and away from the ground, means responsive to said frame upon raising and lowering thereof for rocking said closure member and said connecting member about said first mentioned pivotal connection, means for moving said bowl toward and away from said closure member, and means comprising said bowl for controlling movement of said closure member about said other pivotal connection.

22. Scraping apparatus comprising the combination of a frame adapted to be moved along the ground, a bowl and a closure member carried by said frame, means comprising a connecting member pivotally connected at one point thereof to said frame and at the other point thereof to said closure member, means for raising and lowering said frame toward and away from the ground, means responsive to said frame upon raising and lowering thereof for rocking said closure member and said connecting member about said first mentioned pivotal connection, means for moving said bowl toward and away from said closure member, means including a member adapted to be weighted by said bowl during a predetermined movement of said bowl for preventing rocking movement of said closure member about said other pivotal connection, said last named member being adapted to being unweighted by said bowl during movement of said bowl beyond said predetermined movement.

23. Scraping apparatus comprising the combination of a frame adapted to be moved along the ground, a bowl and a closure member carried by said frame, means comprising a connecting member pivotally connected at one point thereof to said frame and at another point thereof to said closure member, means for raising and lowering said frame toward and away from the ground, means responsive to said frame upon raising and lowering thereof for rocking said closure member and said connecting member about said first mentioned pivotal connection, means for moving said bowl toward and away from said closure member, a cam operable by said bowl, and cam follower means associated with said cam for controlling movement of said closure member about said other pivotal connection.

GORDON E. DANIELS.